US006349627B1

(12) United States Patent
Nusche

(10) Patent No.: US 6,349,627 B1
(45) Date of Patent: Feb. 26, 2002

(54) ELECTROPNEUMATIC POSITIONER

(75) Inventor: Georg Nusche, Berlin (DE)

(73) Assignee: Siemens AG, Munich (DE)

( * ) Notice: Subject to any disclaimer, the term of this patent is extended or adjusted under 35 U.S.C. 154(b) by 0 days.

(21) Appl. No.: 09/242,523

(22) PCT Filed: Jul. 17, 1997

(86) PCT No.: PCT/DE97/01511

§ 371 Date: Dec. 10, 1999

§ 102(e) Date: Dec. 10, 1999

(87) PCT Pub. No.: WO98/07993

PCT Pub. Date: Feb. 26, 1998

(30) Foreign Application Priority Data

Aug. 21, 1996 (DE) .......................................... 196 35 368

(51) Int. Cl.[7] .............................................. F15B 13/04
(52) U.S. Cl. .............................................. 91/30; 91/454
(58) Field of Search ........................... 91/454, 420, 30, 91/32, 33; 137/596.14

(56) References Cited

U.S. PATENT DOCUMENTS

| 2,861,550 A | | 11/1958 | Hanna et al. ................. 91/454 |
| 3,918,349 A | | 11/1975 | Nussbaumer .................... 91/5 |
| 4,563,939 A | * | 1/1986 | Siegrist ........................ 91/459 |
| 4,711,267 A | * | 12/1987 | Schwelm ................ 137/596.15 |
| 5,211,196 A | * | 5/1993 | Schwelm ................. 137/596.2 |

FOREIGN PATENT DOCUMENTS

| DE | 24 10 183 | 9/1974 |
| DE | 25 20 933 | 11/1976 |
| DE | 195 37 493 | 12/1996 |
| EP | 224 478 | 6/1987 |
| EP | 366 605 | 5/1990 |
| GB | 1 400 007 | 7/1975 |
| GB | 2 134 223 | 8/1984 |

OTHER PUBLICATIONS

"SIPART PS Electro–Pneumatic Positioner 6DR3000–1N/E to 2N/E", Siemens AG, 1991.
"The Piezo Pill Curve—What are the Chances for the Piezo ValVe versus Solenoid Valves?, " fluid, Apr., 1989, pp. 34 and 37.
"FoundationS of Hydraulic Switching Technology," Oil Hydraulics and Pneumatics, vol. 38, No. 7, Jan. 1994, Mainz, pp. 388–91.

* cited by examiner

Primary Examiner—Edward K. Look
Assistant Examiner—Thomas E Lazo
(74) Attorney, Agent, or Firm—BakerBotts LLP

(57) ABSTRACT

Electro-pneumatic positioner with a pneumatically driven dual-chamber actuator having a pneumatic main air intake valve and a pneumatic main air discharge valve attached to a pressure pipe of the actuator. The positioner may also include a further main air intake valve and a further main air discharge valve attached to a further pressure pipe of the actuator. Each main valve has an actuating element, with the actuating element for the one and the further main air intake valves each being formed by a corresponding main valve. To manufacture an electro-pneumatic positioner of this type comparatively economically, the actuating element of the one main air discharge valve is formed by a feed pipe which connects the pressurized side of the one main air discharge valve to the interior of the reversing valve of the further main air intake valve. The actuating element of the further main air discharge valve is formed by a further feed pipe which leads from the pressurized side of this main air discharge valve to the reversing valve of the one main air intake valve.

1 Claim, 1 Drawing Sheet

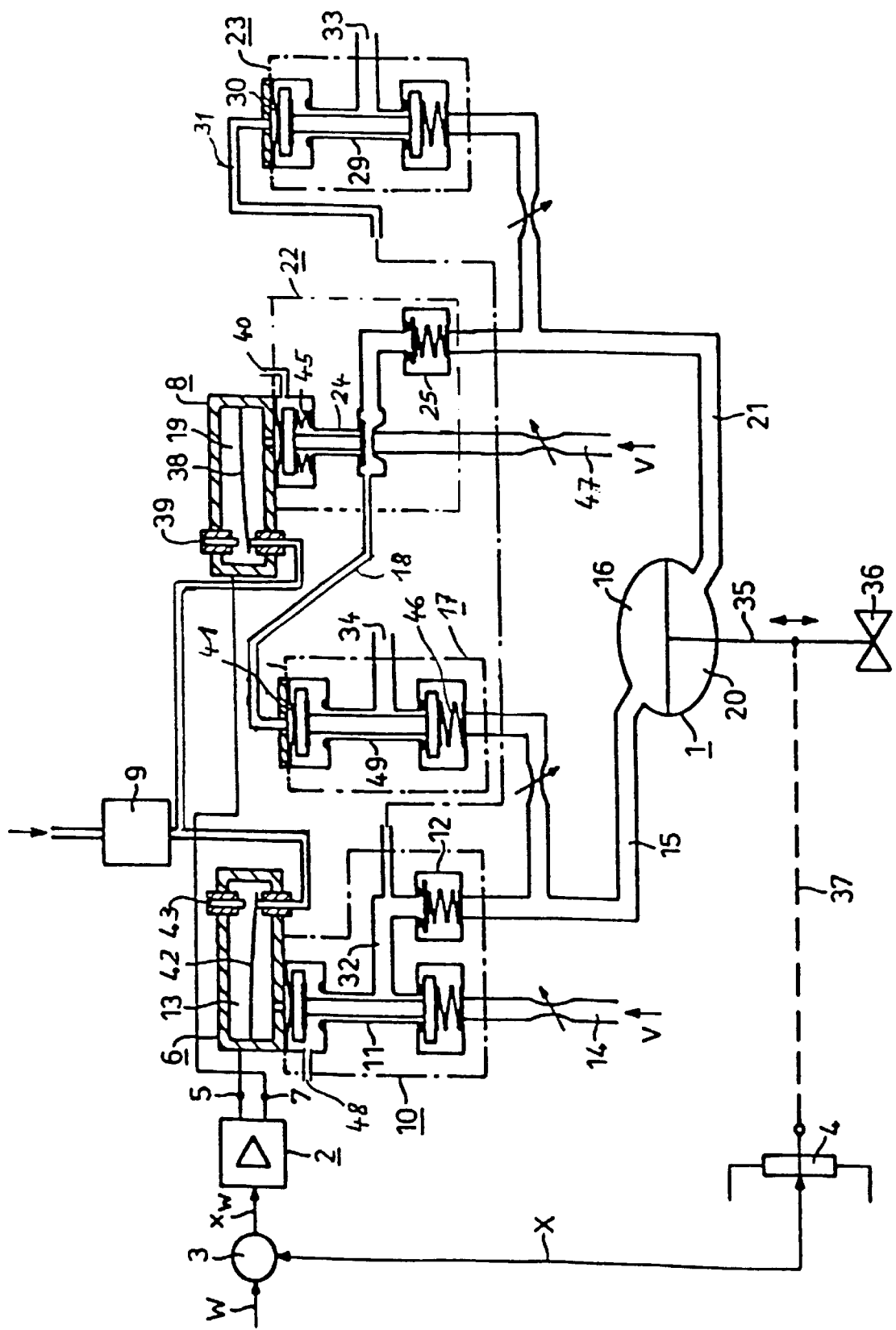

ELECTROPNEUMATIC POSITIONER

FIELD OF THE INVENTION

The present invention relates to an electro-pneumatic positioner with a pneumatically driven dual-chamber actuator having a pneumatic main air intake valve and a pneumatic main air discharge valve attached to a pressure pipe leading to one actuator chamber. The positioner may also include a further pneumatic main air intake valve and a further pneumatic air discharge main valve attached to a further pressure pipe leading to a further actuator chamber. In addition, the positioner may include one actuating element for each main valve, with the actuating element for the one main air intake valve being formed by a control valve that acts upon a reversing valve of the one main air intake valve. The actuating element for the further main air intake valve being formed by a further control valve that acts upon a reversing valve of the further main air intake valve.

BACKGROUND INFORMATION

A conventional pneumatic positioner of this type Siemens SIPART PS 6DR3000 electro-pneumatic positioner, which is described in the Siemens operating instructions "SIPART PS Elektro-pneumatischer Stellungsregler 6DR3000-1N/E bis 2N/E", SIPART PS Electro-Pneumatic Positioner 6DR3000-1N/E to 2N/E order number C73000-B7400-C136-1. As shown in FIG. 2 of the above-mentioned operating instructions, this conventional positioner has a control valve, designed as a piezoelectric valve, assigned to each main valve; a piezoelectric valve of this type is described in The Piezo Pill Curve, "fluid", April 1989, pages 34 and 37. Two control valves, each interacting with the main valves on a pressure pipe of the dual-chamber actuator, are connected to a compressed air source via a pilot pressure regulator.

SUMMARY OF THE INVENTION

An object of the present invention is to simplify the design of the conventional electro-pneumatic positioner, while maintaining its advantageous technical characteristics, in order to reduce production costs.

To achieve this object, the actuating element of the one main air discharge valve of an electro-pneumatic positioner is formed, according to the present invention, by a feed pipe which connects the pressurized side of the one main air discharge valve to the interior of the reversing valve of the further main air intake valve; and the actuating element of the further main air discharge valve is formed by a further feed pipe which leads from the pressurized side of this main air discharge valve to the reversing valve of the one main air intake valve.

German Patent No. 195 37 493, describes an electro-pneumatic positioner that provides actuating elements in the form of feed pipes leading to two main valves, eliminating the need for two control valves. The actuating elements of the further main air intake valve and the further main air discharge valve in this positioner are formed by feed pipes.

One advantage of the positioner according to the present invention is that, compared to the conventional positioner described above, it is designed to eliminate the need for two control valves by having only feed pipes leading to the one pressure pipe and into the one reversing valve of the one main air intake valve instead of the two control valves for controlling the further main air intake valve and the further main air discharge valve. An additional advantage is that the use of only two control valves instead of the previous four control valves makes it possible to eliminate a pilot pressure regulator. According to an additional advantage, the reliability of the positioner according to the present invention is further increased over that of the known positioner because two control valves are replaced by fail-proof feed pipes.

BRIEF DESCRIPTION OF THE DRAWING

FIG. 1 shows an exemplary embodiment of an electro-pneumatic positioner according to the present invention.

DETAILED DESCRIPTION

An exemplary embodiment of a positioner for a pneumatic dual-chamber actuator 1 according to the present invention has, on the input side, control electronics 2 to which is applied, on the input side, a system deviation $x_W$. This deviation $x_W$ is formed in a comparator 3 from a controlled variable X fed back via a potentiometer 4 and a reference variable W, which is supplied to the electro-pneumatic positioner from the outside. An output 5 of control electronics 2 is routed to a control valve 6, which, in the embodiment shown in FIG. 1, is formed by a piezoelectric transducer. A further output 7 of control electronics 2 is connected to a further control valve 8, which is also designed as a piezoelectric transducer. Both control valves 6 and 8 are connected to compressed air via a pilot pressure regulator 9.

Control valve 6 forms an actuating element for a main air intake valve 10, which includes a reversing valve 11 and a check valve 12. The valve member of reversing valve 11 is moved downward as the pressure in interior 13 of control valve 6 rises, thereby allowing a supply pressure V to enter reversing valve 11, and thus check valve 12, via a connecting sleeve 14. Main air intake valve 10 is connected, via check valve 12, to a pressure pipe 15, which leads to a top chamber 16 (as shown in FIG. 1) of pneumatic dual-chamber actuator 1. A main air discharge valve 17, in the form of a shutoff valve, is also connected to pressure pipe 15. The valve member of this main air discharge valve 17 is moved downward from the position shown in FIG. 1 by an actuating element formed by a feed pipe 18 when (as described in greater detail below) the pressure in interior 19 of further control valve 8 is low.

A second chamber 20 of dual-chamber actuator 1 is connected to a further main air intake valve 22 via a further pressure pipe 21 as well as to a further main air discharge valve 23. Further main air intake valve 22 includes a reversing valve 24 and a check valve 25; further main air intake valve 22 is pressurized by further control valve 8, which is connected to pilot pressure regulator 9.

Further main air discharge valve 23 is formed by only one pneumatic reversing valve 29, the pressurized side of which is formed by a membrane 30 and is connected to interior 32 of the one main air intake valve 10 via a feed pipe 31. Further main air discharge valve 23 has a venting duct 33; the one main air discharge valve 17 also has a corresponding vent opening 34.

The dual-chamber actuator 1 acts, via a mechanical connection 35, upon a final control element 36, which can be the actuator unit of a valve which is not illustrated in greater detail. As dual-chamber actuator 1 shifts, an electrical feedback device (in the form of potentiometer 4 in this case) is shifted in relation to the position of dual-chamber actuator 1 by a further mechanical connection 37, represented in FIG. 1 by the dotted line.

Further details of the electro-pneumatic positioner are described on the basis of the following description of its operation:

If an operating voltage (not illustrated) is applied to the positioner before the application of supply pressure V, a valve member 38 of further control valve 8 moves upward from the position illustrated in FIG. 1, thereby closing an air discharge opening 39, after which a pressure builds up in interior 19 of further control valve 8, causing further main air intake valve 22 to close; the one main air discharge valve 17 is not actuated, remaining in the illustrated position, because air is vented through a vent opening 40 via the one feed pipe 18, which acts as an actuating element for the one main air discharge valve 17 and reversing valve 24. If supply pressure V is applied, and if control valve 6 is actuated by an electrical signal at output 5 of control electronics 2, valve member 42 of this control valve moves onto an air discharge opening 43 for the duration of the pulse, causing the pilot pressure to build up in interior 13 of control valve 6, after which the valve member of reversing valve 11 of the one main air intake valve 10 moves downward; this opens reversing valve 11 in the direction of connecting sleeve 14. Supply pressure V is then applied to check valve 12, which opens. A compressed-air pulse thus enters top chamber 16 of dual-chamber actuator 1. At the same time, supply pressure V in interior 32 of the one main air intake valve 10 is transferred, via a further feed pipe 31, to the pressurized side (membrane 30) of further main air discharge valve 23, causing this valve to open in the direction of further pressure pipe 21; this results in a pulsed venting of bottom chamber 20 of dual-chamber actuator 1 via vent opening 33 of further main air discharge valve 23. The control unit of actuator 1, which is illustrated only schematically, is thus moved a short distance downward in a pulsed manner. The signal at output 5 stops, and actuator 1 remains in its current position.

If an electrical signal at further output 7 of control electronics 2 causes the actuator unit of actuator 1 to move upward in a pulsed manner, this actuates further control valve 8 and places its valve member 38 in the position illustrated in the figure for the duration of the signal. This vents interior 19 of further control valve 8, after which the closing member of reversing valve 24 is returned to its open position by the action of a spring 45, and, in addition, a reversing valve 49 of this main air discharge valve 17 is switched, against the action of a spring 46, to the pressurized side (membrane 41) by supply pressure V via a feed pipe 18 acting as the actuating element for the one main air discharge valve 17. This provides pulsed venting of the one pressure pipe 15, according to the electrical signal, and thus of the one chamber 16 of dual-chamber actuator 1 via vent opening 24 in the area of the one main air discharge valve 17. This provides pulsed pressurization of check valve 25 of further main air intake valve 22, so that supply pressure V is applied in a pulsed manner to further chamber 20 of dual-chamber actuator 1 via an input pipe 47 and open check valve 25. At this point, further air discharge valve 23 is in the illustrated valve position because the one control valve 6 has been vented, thus also venting interior 32 of the one main air intake valve 10 via a vent pipe 48.

What is claimed is:

1. An electro-pneumatic positioner, comprising:

a pneumatically driven dual-chamber actuator;

a pneumatic main air intake valve coupled to a pressure pipe, the pressure pipe leading to a chamber of the actuator;

a pneumatic main air discharge valve coupled to the pressure pipe;

a further pneumatic main air intake valve coupled to a further pressure pipe, the further pressure pipe connecting to a further chamber of the actuator;

a further pneumatic main air discharge valve coupled to the further pressure pipe;

a first actuating element cooperating with the pneumatic main air intake valve, the first actuating element being formed by a control valve, the control valve acting upon a reversing valve which is a component of the pneumatic main air intake valve;

a second actuating element cooperating with the further pneumatic main air intake valve, the second actuating element being formed by a further control valve, the further control valve acting upon a further reversing valve;

a third actuating element cooperating with the pneumatic main air discharge valve, the third actuating element being formed by a feed pipe, the feed pipe connecting a pressurized side of the pneumatic main air discharge valve to an interior side of the further reversing valve which is a component of the further pneumatic main air intake valve; and a fourth actuating element cooperating with the further pneumatic main air discharge valve, the fourth actuating element being formed by a further feed pipe, the further feed pipe connecting from a further pressurized side of the further pneumatic main air discharge valve to the reversing valve.

* * * * *